United States Patent [19]

Saitoh et al.

[11] 4,405,274
[45] Sep. 20, 1983

[54] SNAP RING INTENDED FOR PREVENTION OF LOOSENESS OF A NUT

[75] Inventors: Tatsuo Saitoh, Niisato; Tsutomu Hasebe, Koganei, both of Japan

[73] Assignee: Toho Asechiren Kabushiki-kaisha, Tokyo, Japan

[21] Appl. No.: 343,080

[22] Filed: Jan. 27, 1982

Related U.S. Application Data

[63] Continuation of Ser. No. 137,323, Apr. 4, 1980, abandoned.

[30] Foreign Application Priority Data

Nov. 13, 1979 [JP] Japan ............................... 54-156554

[51] Int. Cl.³ .................... F16B 21/18; F16B 39/02
[52] U.S. Cl. .................................. 411/249; 411/518
[58] Field of Search ............... 411/249, 248, 247, 219, 411/222, 237, 518, 517, 353

[56] References Cited

U.S. PATENT DOCUMENTS 2,265,905 12/1941 Hesse et al. .......................... 411/249
3,460,427 8/1969 Baumgarten ........................ 411/518

FOREIGN PATENT DOCUMENTS 1275078 9/1961 France ................................. 411/249
220816 7/1942 Switzerland ........................ 411/518
174427 1/1922 United Kingdom ................ 411/246

Primary Examiner—Ramon S. Britts
Attorney, Agent, or Firm—Jordan & Hamburg

[57] ABSTRACT

A snap ring is attachable to and detachable from a bolt with ease, the snap ring having a twisted part that enables the snap ring to extend around portions of two adjacent convolutions of the thread, the snap ring also having a split to enable portions of the snap ring to pass from one convolution to an adjacent convolution over the crest of a thread to thereby prevent the nut from coming off the bolt.

9 Claims, 3 Drawing Figures

SNAP RING INTENDED FOR PREVENTION OF LOOSENESS OF A NUT

This is a continuation of application Ser. No. 137,323, filed Apr. 4, 1980, now abandoned.

BACKGROUND OF THE INVENTION

The present invention relates to the snap ring to be used for prevention of looseness of a nut.

Hitherto, there is a snap ring equipped with the setting seats providing small holes by boring at both ends. This snap ring requires the use of a fixture. The ring is opened by putting the tip end of the fixture into the small hole and is mounted on the bolt while being maintained in that state. However, the snap ring is made of special steel formed press shaping and hardening, and insertion of the fixture into the ring is not a simple task in that opening the ring wide requires a strong force. Besides, the task of attaching was extremely difficult because it tends to fly off the fixture when opened wide. As for other snap rings, there is known a snap ring having a flection ring previously provided in the nut. It is high in cost due to the amount of labor required to manufacture it, and once it was employed it was very difficult to reuse it.

A DETAILED EXPLANATION OF THE INVENTION

The object of the present invention is to provide a snap ring that can be easily attached and is practical to use.

Another object of the present invention is to offer such a snap ring that can be easily detached from the bolt and is conveniently reused.

Furthermore, other object of the present invention is to provide an inexpensive snap ring with reduced production cost.

The characteristic of the snap ring covered by the present invention lies in having a clearance part and in the shape that can fit to the screw thread of a bolt, shifting a single pitch.

An explanation of the characteristic for the present invention will provide much deeper understanding by an embodiment as illustrated in the accompanying drawing. The drawing is as follows.

DESCRIPTION OF THE PREFERRED EMBODIMENTS

Figure 1:
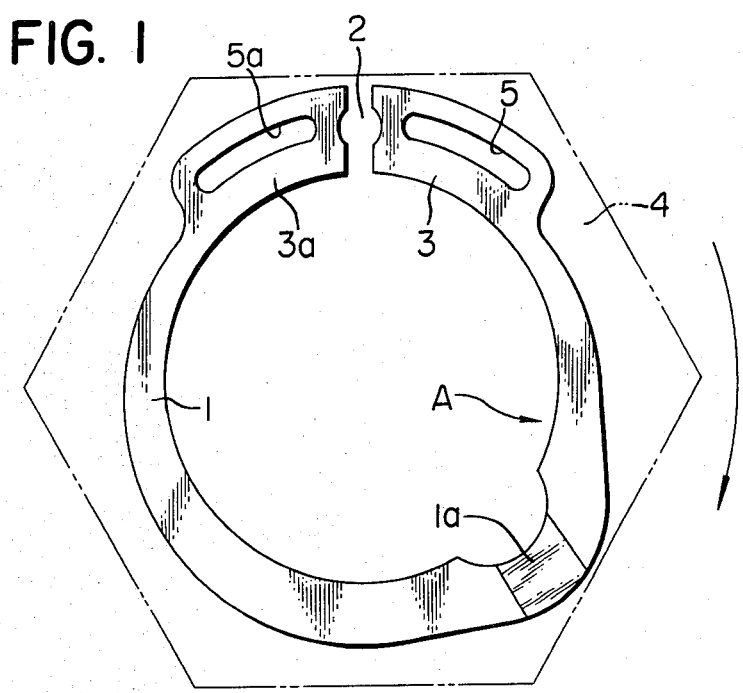
FIG. 1 is a plan view.
Figure 2:
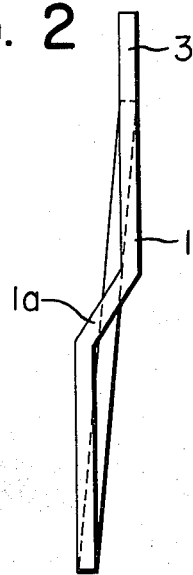
FIG. 2 is a side view and
FIG. 3 is a partially sectional view.
Figure 3:
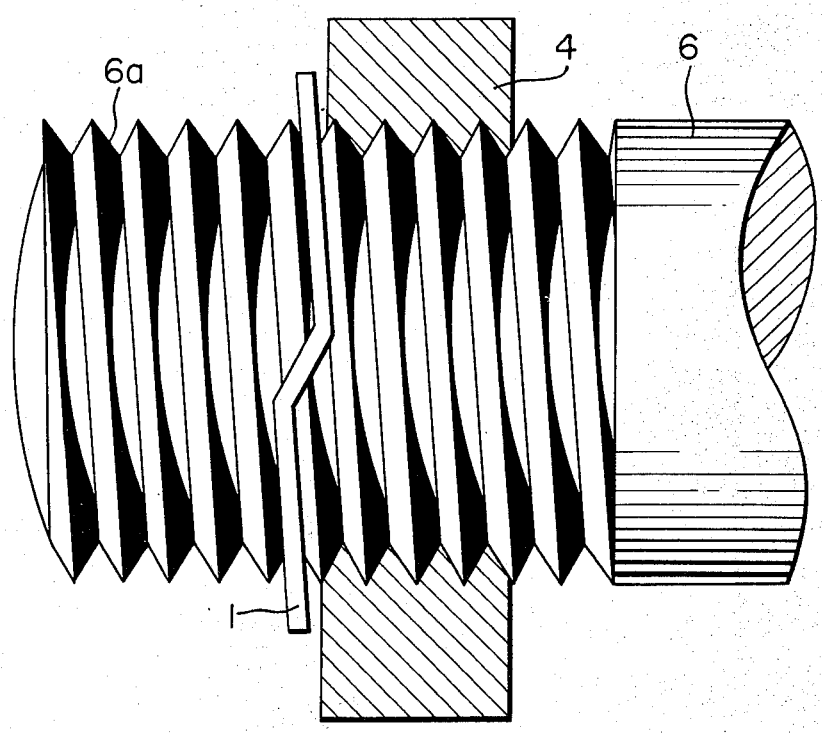

Referring to the drawings, an explanation follows with regard to one embodiment of the present invention. In FIG. 1, a ring body 1 of a snap ring A is made with standard dimensions that conforms to the pitch and thread diameter of a bolt, and it is necessary to change its thickness and width to strengthen the snap force in accordance with load conditions and purpose of use. In this connection, setting seats 3, 3a are formed having a clearance 2 located at the center and on these seats are provided elongated grooves 5, 5a along the rotary direction of nut 4. As shown in FIG. 2 and FIG. 3, ring body 1 also has a twisted part 1a so that it can fit over the screw thread 6a of bolt 6 at a single shifted pitch.

Now describing the action of the present invention, nut 4 is turned in the direction of the arrow as shown in FIG. 1 and screwed on the thread of bolt 6. Ring body 1 is then screwed on the screw thread 6a of bolt 6 by hand or by using a screwdriver in the elongated 5, 5a.

After the nut 4 is fastened in the required position, the nut 4 may begin to become loose as it turns in its return direction. However, ring body 1 then meshes with the thread 6a of bolt 6, disabling the nut 4 from turning more in its return direction.

The only thing to do for removing nut 4 from bolt 6 is to release such a meshing with the thread 6a of bolt 6 and let the nut turn in its return direction by making the setting seats 3, 3a wide open through an insertion of the tip end of a screwdriver, or other tool into the clearance 2 between the setting seats 3 and 3a.

What we claim is:

1. A snap ring adapted to be disposed on a threaded element adjacent to a threaded nut to prevent the threaded nut from coming off of the threaded element, said threaded element being of the type having alternate spiral crests and troughs, said snap ring comprising a twisted section such that the snap ring extends around portions of two adjacent troughs of the threaded element with said twisted section extending across the crest of the thread between said two troughs, said snap ring having a split enabling the snap ring to expand diametrically, said split being defined by two juxtaposed end portions on said ring, said split being annularly spaced from said twisted section so as to define an annular ring portion between said split and said twisted section, said snap ring being disposed on said threaded element with said split and said annular ring portion being disposed in the trough closest to said nut such that when the nut starts to unthread, said nut engages said two end portions of said ring juxtaposed to the split to force said two end portions to spread apart annularly and to move from said one trough closest to said nut to the next trough as said two end portions pass over the crest of the thread and settle in said next trough, whereby the snap ring prevents the nut from coming off of the threaded element.

2. A snap ring according to claim 1, wherein said annular ring portion between said split and said twisted section is less than one hundred and eighty degrees.

3. A snap ring according to claim 1, wherein said end portions defining said split are terminating ends, said terminating ends having tool engaging means to facilitate spreading of the ring by a tool.

4. A snap ring according to claim 3, wherein said tool engaging means comprises grooves opening in said terminating ends.

5. A snap ring according to claim 1, wherein said end portions of said ring has grooves therein adapted to be engaged by a tool to facilitate manual manipulation of said snap ring.

6. A snap ring according to claim 5, wherein said end portions defining said split are terminating ends, said grooves being spaced from said terminating ends.

7. A snap ring adapted to be disposed on a threaded element adjacent to a threaded nut to prevent the threaded nut from coming off of the threaded element, said threaded element being of the type having alternate spiral crests and troughs, said snap ring comprising a twisted section such that the snap ring extends around portions of two adjacent troughs of the thread with said twisted section extending across the crest of the thread between said two troughs, said snap ring having a split enabling the snap ring to expand diametrically, said split being defined by two juxtaposed terminating end portions on said ring, said split being annularly spaced from said twisted section so as to define one annular ring portion between said split and said twisted section and to define another annular ring portion between said split and said twisted section, said one annular ring portion being annularly longer than said other annular ring portion, said snap ring being disposed on said threaded element with said split and said one annular ring portion being disposed in the one trough closest to said nut such that when the nut starts to unthread, said nut engages said two terminating end portions of said ring juxtaposed to the split to force said two terminating end portions to spread apart annularly from said one trough closest to said nut over the intervening crest to the next trough to settle in said next trough, whereby the snap ring prevents the nut from coming off of the threaded element.

8. A snap ring according to claim 7, wherein said two terminating end portions are spaced from one another.

9. The combination comprising a snap ring, a threaded element, and a threaded nut, wherein the snap ring prevents the threaded nut from coming off of the threaded element, said threaded element having alternate troughs and crests, said snap ring having a twisted section such that the snap ring extends around portions of two adjacent troughs of the threaded element with said twisted section extending across the crest of the thread between said two troughs, said snap ring having a split enabling the snap ring to expand diametrically, said split being defined by two juxtaposed terminating end portions on said ring, said split being annularly spaced from said twisted section so as to define one annular ring portion between said split and said twisted section and to define another ring portion between said split and said twisted section, said one annular ring portion being annularly longer than said other annular ring portion, said snap ring being disposed on said threaded element with said split and said one annular ring portion being disposed in the one trough closest to said nut such that when the nut starts to unthread, said nut engages said two terminating end portions of said snap ring juxtaposed to the split to force said two terminating end portions from said one trough closest to said nut to the next trough as the snap ring spreads and said two terminating end portions pass over the crest of the thread and settle in said next trough, whereby the snap ring prevents the nut from coming off of the threaded element.

* * * * *